(12) United States Patent
Araki et al.

(10) Patent No.: US 7,104,821 B2
(45) Date of Patent: Sep. 12, 2006

(54) ROTARY CONNECTOR

(75) Inventors: Shunji Araki, Miyagi-ken (JP); Seishi Takahashi, Auburn Hills, MI (US); Kazuhiko Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/230,230

(22) Filed: Sep. 13, 2005

(65) Prior Publication Data
US 2006/0057863 A1 Mar. 16, 2006

(30) Foreign Application Priority Data

Sep. 16, 2004 (JP) ............... 2004-270229
Feb. 1, 2005 (JP) ............... 2005-025265

(51) Int. Cl.
*H01R 35/04* (2006.01)

(52) U.S. Cl. ..................................... 439/164

(58) Field of Classification Search ............... 439/164, 439/15
See application file for complete search history.

(56) References Cited

U.S. PATENT DOCUMENTS

| | | | | |
|---|---|---|---|---|
| 5,137,463 A * | 8/1992 | Sasaki et al. | ............... | 439/164 |
| 5,460,535 A * | 10/1995 | Bolen | .................. | 439/164 |
| 5,752,844 A * | 5/1998 | Kawamoto | ............. | 439/164 |
| 5,871,367 A * | 2/1999 | Ichikawa et al. | ......... | 439/164 |
| 5,904,585 A * | 5/1999 | Nishikigi et al. | .......... | 439/164 |
| 5,951,311 A * | 9/1999 | Kato et al. | ................. | 439/164 |
| 6,343,946 B1 * | 2/2002 | Matsumoto | ............... | 439/164 |
| 6,368,127 B1 * | 4/2002 | Araki et al. | ................ | 439/164 |
| 6,390,838 B1 * | 5/2002 | Kawamura | ................ | 439/164 |
| 6,409,527 B1 * | 6/2002 | Adachi et al. | ............. | 439/164 |
| 6,435,886 B1 * | 8/2002 | Oguma | ........................ | 439/164 |
| 6,572,393 B1 * | 6/2003 | Kawamura | ................ | 439/164 |
| 2002/0025705 A1 * | 2/2002 | Araki et al. | ................ | 439/164 |

FOREIGN PATENT DOCUMENTS

| | | |
|---|---|---|
| EP | 0 968 886 | 1/2000 |
| EP | 1 094 570 | 4/2001 |
| EP | 1 318 577 | 6/2003 |
| JP | 2003-174715 | 6/2003 |

* cited by examiner

*Primary Examiner*—Alexander Gilman
(74) *Attorney, Agent, or Firm*—Brinks Hofer Gilson & Lione (57) ABSTRACT

A rotary connector includes a case, a cover, a rotor having a top panel part and a first cylindrical part, a rotor snap having locking parts locked with an outer surface of the cover and a second cylindrical part snap-fitted to the first cylindrical part, flexible cables wound windably/rewindably in the case, and a ring-shaped plate part. In this case, a holding projection project outward in a radial direction from the outer circumferential surface of the second cylindrical part between a lower end of the first cylindrical part and the locking parts, and an inner rim of the cover is provided with a holding step so as to form a step. Furthermore, a wall surface forming the step of the holding step faces side surface of the holding projection, and an inner rim of the cover is rotatably interposed between lower surface of the holding projection and an upper surface of the ring-shaped plate part.

18 Claims, 5 Drawing Sheets

ROTARY CONNECTOR

BACKGROUND OF THE INVENTION

1. Field of the Invention

The present invention relates to a rotary connector which electrically connects an electrical device provided in a steering wheel with an electrical device provided in a vehicle, and more particularly, to a structure of connecting a fixed-side housing with a movable-side housing.

2. Description of the Related Art

A conventional rotary connector has been known before (for example, Japanese Unexamined Patent Application Publication No. 2003-174715). As shown FIG. 5, the conventional rotary connector includes a fixed-side housing 103 that includes a cylindrical case 101 and a ring-shaped cover 102 for covering one end of the case 101; a movable-side housing 106 that includes a ring-shaped top panel part 104 for covering the other end of the case 101 and a first cylindrical part 105 rising downward from an inner circumferential end of the top panel part 104; a rotor snap 110 that includes a ring-shaped locking part 107 locked with an outer surface of the cover 102, a second cylindrical part 108 rising from an inner circumferential end of the locking part 107, and a third cylindrical part 109 connected to a steering wheel (not shown) joined with the second cylindrical part 108 so as to rotatably assemble the movable-side housing 106 to the fixed-side housing 103 by combining the first cylindrical part 105 with the second cylindrical part 108; a ring-shaped holder 111 that is received in ring-shaped space formed by assembling the movable-side housing 106 to the fixed-side housing 103; a roller 112 that is rotatably mounted on the ring-shaped holder 111; and a flexible cable 113 that is wound on the roller 112, and of which one end is connected to the movable-side housing 106 and the other end is connected to the fixed-side housing 103.

Figure 5:
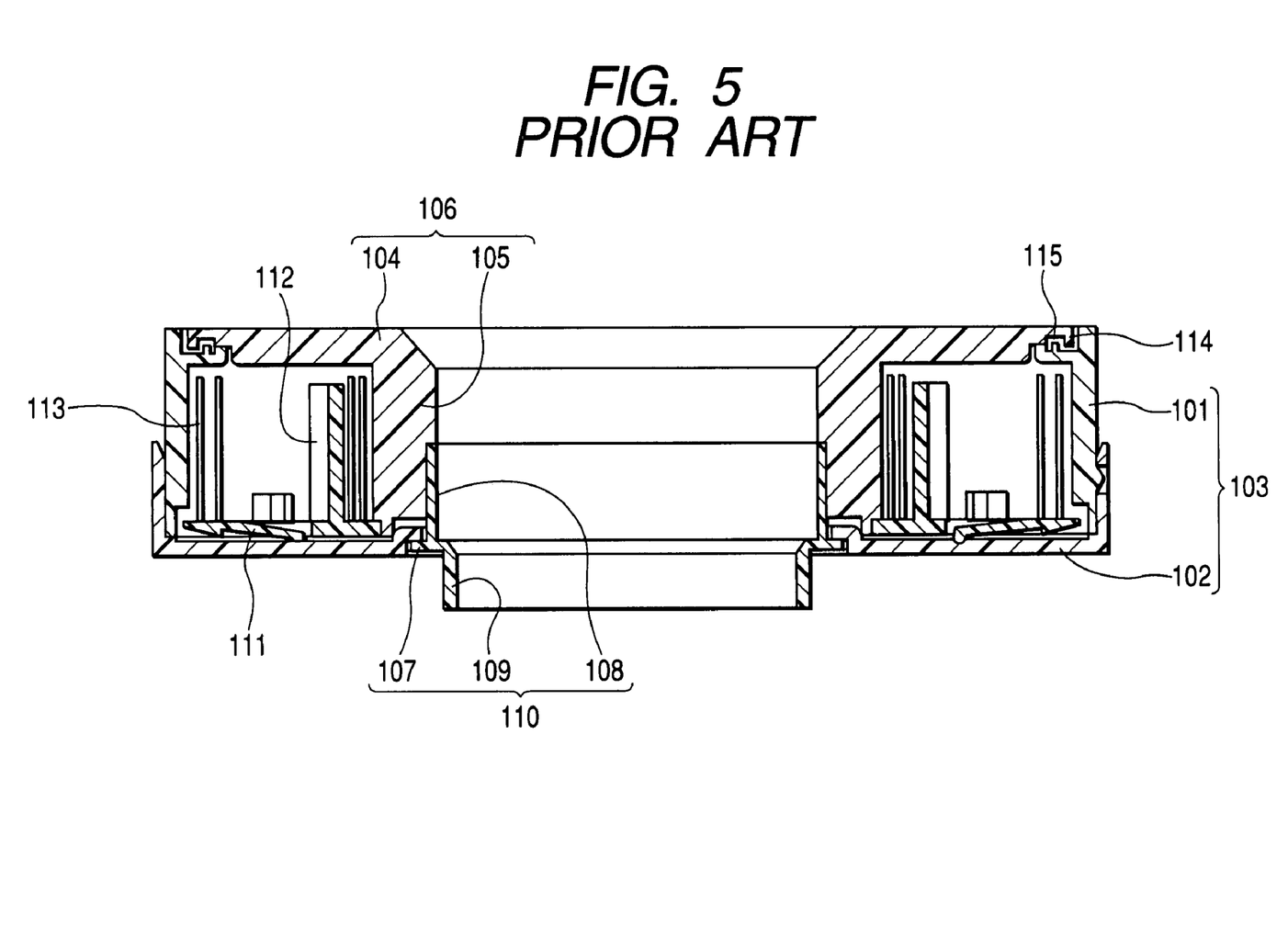
FIG. 5 is a cross-sectional view showing a conventional rotary connector.

In the conventional rotary connector, an annular projection 114 formed on the upper side of an inner surface of the case 101 faces an annular recess 115 formed on a lower surface of the top panel part 104, and a lower surface of the cover 102 faces an upper surface of the locking part 107. For this reason, an axial position of the movable-side housing 106 with respect to the fixed-side housing 103 is regulated. Furthermore, the annular projection 114 is engaged with the annular recess 115, and a side surface of the locking part 107 faces a wall part 116 forming a step flexuously formed on an inner rim of the cover 102. For this reason, a radial position of the movable-side housing 106 with respect to the fixed-side housing 103 is regulated.

In this way, the movable-side housing 106 is rotatably supported on the fixed-side housing 103. In this case, if the fixed-side housing 103 is fixed to a stator part of a vehicle and the movable-side housing 106 is connected to a steering wheel, an electrical device provided in the steering wheel can be electrically connected to an electrical device provided in the vehicle through the flexible cable 113.

However, the conventional rotary connector has the following problems: Since the conventional rotary connector is formed by injection molding of insulating resin, it is difficult to accurately mold a portion, which is away from a rotation axis in a radial direction thereof, with resin. Moreover, since variation per hour causes large deformation, the annular projection 114 and the annular recess 115, which are away from a rotation axis in a radial direction and face each other, are in slide contact with each other during the rotation of the movable-side housing 106. Therefore, abnormal noise occurs.

SUMMARY OF THE INVENTION

Accordingly, the invention has been made to solve the above-mentioned problems, and it is an object of the invention to provide a rotary connector in which position regulating portions of the movable-side housing can be accurately molded with resin with respect to the fixed-side housing and abnormal noise does not occur despite deformation caused by temperature variation and variation per hour.

According to an aspect of the invention, a rotary connector includes a fixed-side housing that includes a cylindrical case and a ring-shaped cover for covering a lower open end of the case; a movable-side housing that includes a ring-shaped top panel part for covering an upper open end of the case and a first cylindrical part protruding downward from an inner circumferential end of the top panel part; a rotor snap that includes a second cylindrical part connected to the first cylindrical part by being inserted therein to from under the cover and locking parts having segments protruding outward from a lower end of the second cylindrical part in a radial direction thereof; receiving space that is formed by rotatably assembling the movable-side housing to the fixed-side housing; flexible cables that are electrically connected to the fixed-side housing and the movable-side housing in the receiving space; and a ring-shaped plate part that is locked with the locking parts. In this case, a holding projection projects outward in a radial direction from the outer circumferential surface of the second cylindrical part between a lower end of the first cylindrical part and the locking parts, and a holding step is provided so as to form a step on the inner rim of the upper surface of the cover. Furthermore, a wall surface forming the step of the holding step faces side surface of the holding projection, and an inner rim of the cover is rotatably interposed between lower surface of the holding projection and an upper surface of the ring-shaped plate part.

As mentioned above, the cover is rotatably interposed between the holding projection and the ring-shaped plate part, and a wall surface forming the step of the holding step faces side surface of the holding projection. For this reason, it is possible to regulate an axial position and a radial position of the movable-side housing with respect to the fixed-side housing by a portion of the movable-side housing close to a rotation axis. Therefore, it is possible to accurately mold the position regulating portions of the movable-side housing with respect to the fixed-side housing with resin, and to reduce deformation caused by temperature variation and variation per hour. For this reason, occurrence of abnormal noise is suppressed during the rotation of the movable-side housing.

In addition, according to the invention, in the above-mentioned rotary connector, it is preferable that a ring-shaped holder, which rotatably supports rollers for reversely winding the flexible cables, be rotatably received in the receiving space, and an inner rim of the ring-shaped holder be rotatably interposed between a lower surface of the first cylindrical part and upper surfaces of the holding projection so that the ring-shaped holder is rotatably supported on the second cylindrical part.

As mentioned above, the ring-shaped holder having the rollers for reversing the flexible cables is arranged in the receiving space, and the ring-shaped holder is rotatably supported on the second cylindrical part of the rotor snap. Accordingly, it is possible to smoothly wind or rewind the flexible cables and to suppress occurrence of abnormal noise during the rotation of the movable-side housing.

Furthermore, according to the invention, in the above-mentioned rotary connector, it is preferable that the cover be provided with an engaging step so that a step is formed on an inner rim of an upper surface of the cover, and a wall surface forming a step of the engaging step face a side surface of the ring-shaped plate part.

According to the above-mentioned structure, it is possible to reduce a height of the rotary connector as a height of the engaging step is reduced. Therefore, the rotary connector can be slimmed.

Moreover, according to the invention, in the above-mentioned rotary connector, it is preferable that the ring-shaped holder be provided with an elastic part for elastically biasing on the upper surface of the cover.

According to the above-mentioned structure, it is possible to suppress rattling of the ring-shaped holder in a direction of a rotation axis thereof and to reduce the rattle even when the rotary connector vibrates in the up-and-down direction.

In addition, according to the invention, in the above-mentioned rotary connector, it is preferable that the ring-shaped plate part be detachably locked with the locking parts and include a cam part protruding downward in a direction of a rotation axis.

According to the above-mentioned structure, since the ring-shaped plate part is provided with the cam part for connecting the cancel mechanism, it is possible to cope with a different kind of a cancel mechanism that has a different connection part to be connected with the cam part just by replacing the ring-shaped plate part.

Therefore, it is possible to commoditize the movable-side housing and the fixed-side housing, and to reduce manufacturing cost of the rotary connector having the cancel member.

According to another aspect of the invention, a rotary connector includes a fixed-side housing that includes a cylindrical case and a ring-shaped cover for covering a lower open end of the case; a movable-side housing that includes a ring-shaped top panel part for covering an upper open end of the case and a first cylindrical part protruding downward from an inner circumferential end of the top panel part; a rotor snap that includes a second cylindrical part connected to the first cylindrical part by being inserted thereinto from under the cover and locking parts having segments protruding outward from a lower end of the second cylindrical part in a radial direction thereof; receiving space that is formed by rotatably assembling the movable-side housing to the fixed-side housing; flexible cables that are electrically connected to the fixed-side housing and the movable-side housing in the receiving space; and a ring-shaped plate part that is locked with the locking parts. In this case, holding projection projects outward in a radial direction from the outer circumferential surface of the second cylindrical part between a lower end of the first cylindrical part and the locking parts, and an inner rim of the cover is rotatably interposed between lower surface of the holding projection and an upper surface of the ring-shaped plate part. Furthermore, an inner rim of the cover is provided with a wall surface forming a step that faces side surface of the holding projection or a side surface of the ring-shaped plate part with a small clearance.

According to the above-mentioned structure, since an axial position and a radial position of the movable-side housing with respect to the fixed-side housing can be regulated by a portion of the movable-side housing close to a rotation axis, it is possible to accurately mold the position regulating portions of the movable-side housing with respect to the fixed-side housing with resin and to reduce deformation caused by temperature variation and variation per hour thereby suppressing occurrence of abnormal noise during the rotation of the movable-side housing.

Furthermore, according to the invention, in the above-mentioned rotary connector, it is preferable that an engaging step capable of receiving an outer circumference of the ring-shaped plate part be formed on an inner rim of a lower surface of the cover and a wall surface forming a step of the engaging step face a side surface of the ring-shaped plate part.

According to the above-mentioned structure, it is possible to reduce a height of the rotary connector as a height of the engaging step is reduced. Therefore, the rotary connector can be slimmed.

Moreover, according to the invention, in the above-mentioned rotary connector, it is preferable that a holding step capable of receiving outer circumference of the holding projection be formed on an inner rim of a lower surface of the cover and a wall surface forming a step of the holding step face side surface of the holding projection.

According to the above-mentioned structure, it is possible to reduce a height of the rotary connector as a height of the holding step is reduced. Therefore, the rotary connector can be slimmed.

In addition, according to the invention, in the above-mentioned rotary connector, it is preferable that the ring-shaped plate part be detachably locked with the locking parts and include a cam part protruding downward in a direction of a rotation axis.

According to the above-mentioned structure, since the ring-shaped plate part is provided with the cam part for connecting the cancel mechanism, it is possible to cope with a different kind of a cancel mechanism that has a different connection part to be connected to the cam part just by replacing the ring-shaped plate part. Therefore, it is possible to commoditize the movable-side housing and the fixed-side housing, and to reduce manufacturing cost of the rotary connector having the cancel member.

DESCRIPTION OF THE PREFERRED EMBODIMENTS

Figure 1:
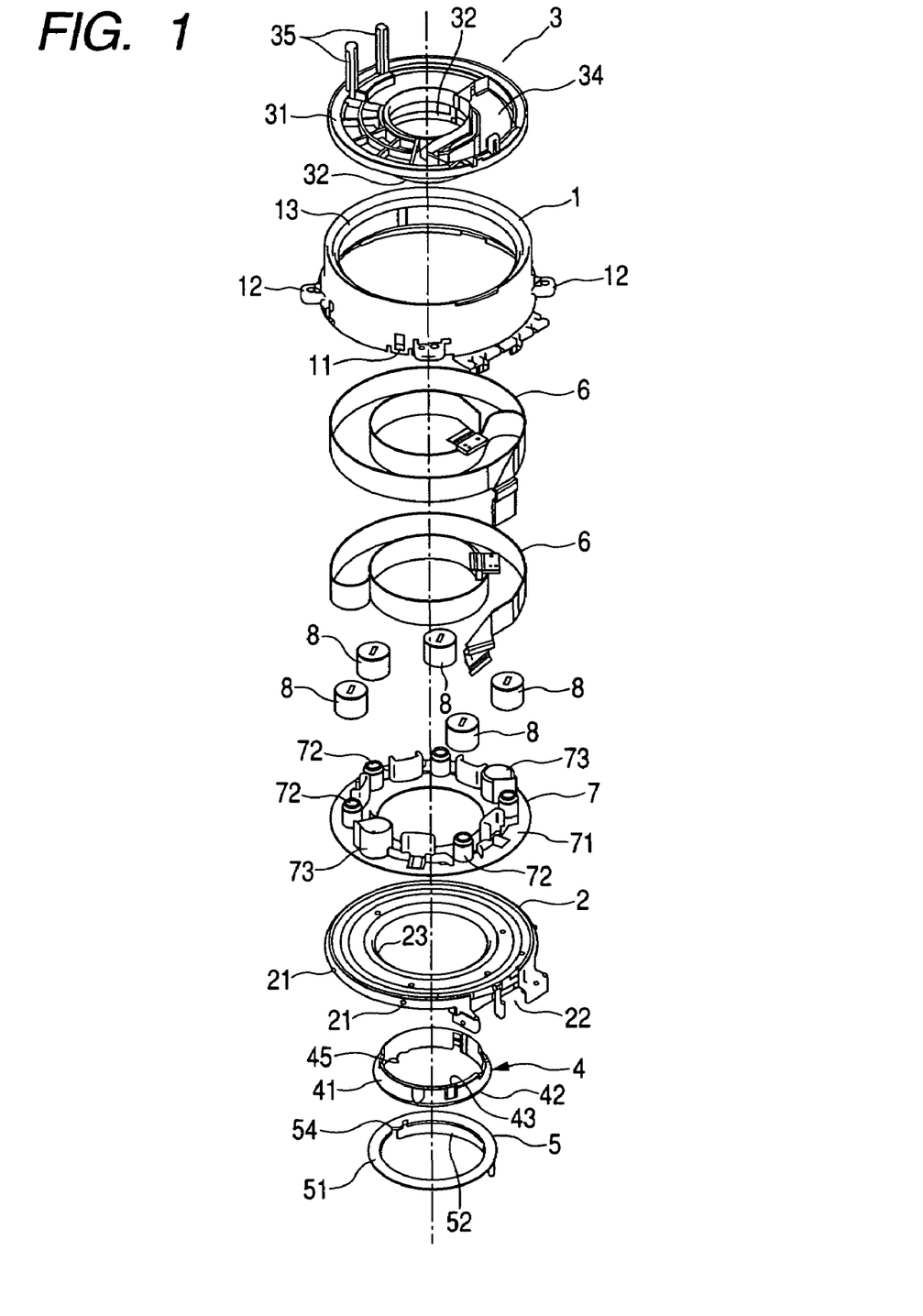
FIG. 1 is an exploded perspective view of a rotary connector according to a first embodiment of the invention.
Figure 2:
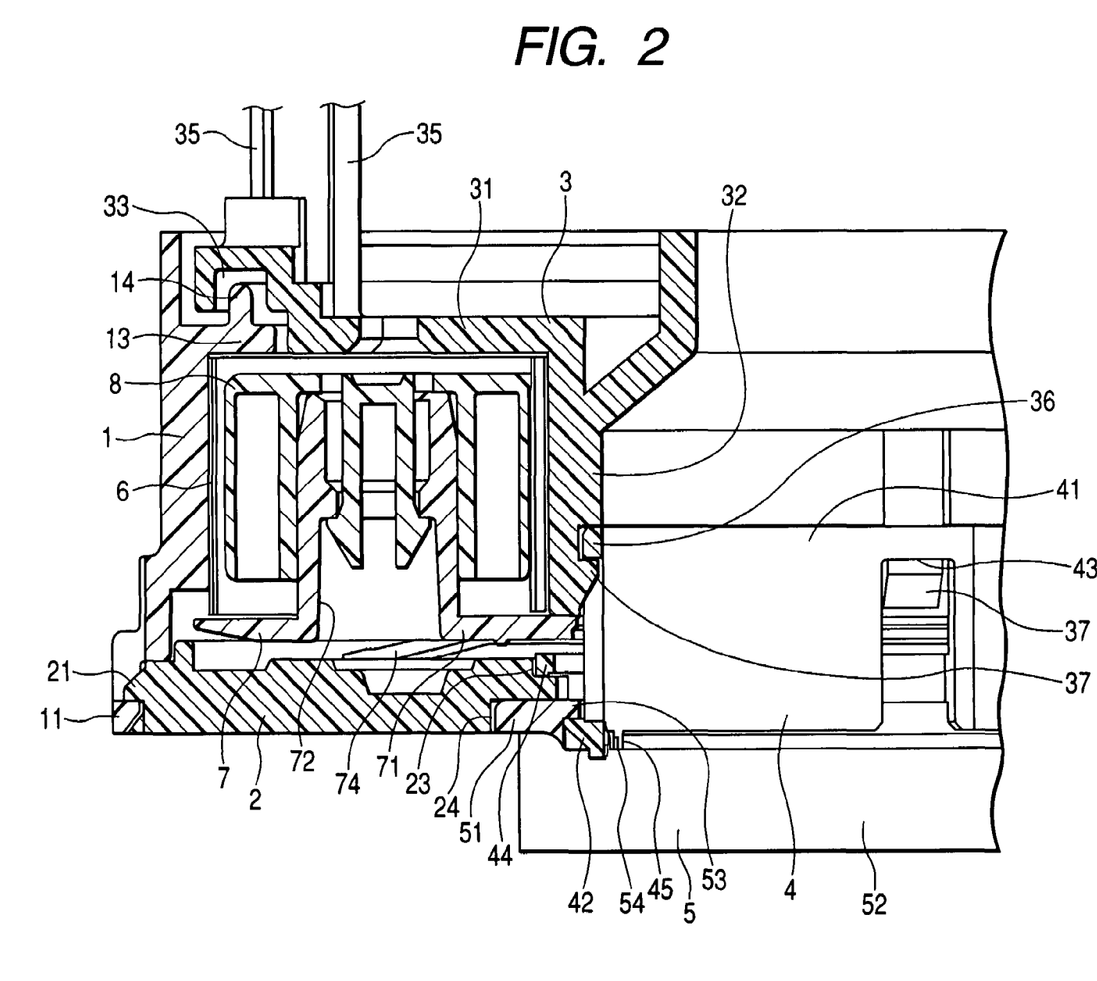
FIG. 2 is a cross-sectional view showing main parts of the rotary connector according to the first embodiment.

Hereinafter, a rotary connector according to a first embodiment of the invention will be described with reference to FIGS. 1 and 2. FIG. 1 is an exploded perspective view showing a rotary connector according to the present embodiment, and FIG. 2 is a cross-sectional view showing main parts of the rotary connector according to the present embodiment.

As shown in FIG. 1, the rotary connector according to the present embodiment is mainly composed of a case 1, a cover 2, a rotor (movable-side housing) 3, a rotor snap 4, a cancel member 5, flexible cables 6, a ring-shaped holder 7, and rollers 8. Every member other than the flexible cables 6 is made of insulating resin.

The case 1 is formed in a cylindrical shape having a required size, and first engaging parts 11 for snap-fitting the cover 2 and mounting bosses 12 for fixing the case 1 to a stator part of a vehicle are formed on the lower side of an outer circumferential surface of the case 1. Furthermore, an annular protrusion 13 protrudes inward from the upper side of an inner circumferential surface of the case 1 in a radial direction thereof, and as shown in FIG. 2, an annular projection 14 protrudes upward from the upper surface of the annular protrusion 13.

The cover 2 is formed in a ring shape so that the cover 2 can be joined to a lower open end of the case 1. The cover 2 includes first locking segments 21 engaged with the first engaging parts 11 that are formed on the lower side of an outer circumferential surface of the case 1, and a connecting part 22 to be connected to an external connector, which are formed on the outer circumferential surface of the cover 2. In addition, a holding step 23 is formed on an inner rim of an upper surface of the cover 2. The holding step 23 forms a step so as to be rotatably engaged with a holding projection 44, which is formed on the outer circumference of a second cylindrical part 41 of a rotor snap 4 to be described below. Further, an engaging step 24 is formed on an inner rim of a lower surface of the cover 2. The engaging step 24 forms a step so as to be rotatably engaged with a ring-shaped plate part 51 to be described below. Accordingly, the holding step 23 forms a step rising downward from the upper surface of the cover 2 on the inner rim, and the engaging step 24 forms a step rising upward from the lower surface of the cover 2 on the inner rim. Here, the ring-shaped plate part 51 regulates that the rotor (movable-side housing) 3 is moved upward in the direction of a rotation axis with respect to a fixed-side housing.

The case 1 and the cover 2 are united by snap-fitting the first locking segments 21 to the first engaging parts 11 so as to form the fixed-side housing.

The rotor 3 includes a ring-shaped top panel part 31 capable of being joined to upper open end of the case 1, and a first cylindrical part 32 that is connected to an inner circumference of the top panel part 31 and protrudes downward from the lower surface of the top panel part 31. An annular recess 33, which is engaged with the annular projection 14 of the case 1 with a large clearance, is formed on an outer rim of a lower surface of the top panel part 31, and connecting projections 35 which are used for connecting the mounting part 34 for an external connector and the rotor 3 to a steering wheel are formed on the upper surface of the top panel part 31. Moreover, as shown in FIG. 2, a plurality of second locking segments 37 is formed on a lower end of an inner circumferential surface of the first cylindrical part 32 with a required interval in the same direction.

The rotor snap 4 includes the second cylindrical part 41 which is connected to the first cylindrical part 32 by being inserted therein to from under the cover 2, a plurality of locking parts 42 protruding downward from a lower end of the second cylindrical part 41, and a plurality of rotating prevention projections 45. As shown in FIG. 2, the tips of the locking parts 42 are provided with segments protruding outward in a radial direction thereof. Here, since radial size of the outer surface of the locking parts 42 is set to be smaller than that of the inner surface of the cover 2, the rotor snap 4 is snap-fitted to the rotor 3 which is assembled in the case 1 and then the case 1 and the cover 2 can be connected to each other so that the wall surface of the holding step 23 faces/is engaged with the outer surface of the holding projection 44, during the assembly of the rotary connector. Consequently, since the case 1 and the cover 2 can be engaged with each other without any harm to the wall surface forming the step of the holding step 23 which faces the outer surface of the holding projection 44 with a small clearance and the side surface of the holding projection 44, it is possible to appropriately regulate a radial position of the movable-side housing with respect to the fixed-side housing. Moreover, it is apparent from FIG. 2 that radial size of the wall surface of the holding step 23 is set to be larger than that of the inner surface of the cover 2.

Furthermore, the second cylindrical part 41 includes second engaging parts 43 snap-fitted to second locking segments 37 of the first cylindrical part 32, and the holding projection 44 rotatably engaged with the holding step 23 which are formed on the inner rim of the upper surface of the cover 2. Here, the holding projection 44 protrudes outward from the outer circumferential surface of the second cylindrical part 41 between the lower end of the first cylindrical part 32 and the ring-shaped locking parts 42 in the radial direction of the cylindrical part 41. Consequently, as shown in FIG. 2, since the side surface of the holding projection 44 faces the wall surface forming the step of the holding step 23 of the cover 2 with a small clearance, it is possible to regulate a radial position of the movable-side housing with respect to the fixed-side housing by a portion close to a rotation axis of the rotor (movable-side housing) 3. Moreover, it is possible to accurately mold the position regulating portions thereof with resin. Therefore, it is possible to reduce deformation caused by temperature variation and variation per hour.

The ring-shaped plate part 51 includes engaging parts 53 which are snap-fitted to the locking parts 42 formed on the lower end of the rotor snap 4, and notch parts 54 engaged with the rotating prevention projections 45 to be rotatably engaged with the engaging step 24 formed on the inner rim of the lower surface of the cover 2 in the state in which the ring-shaped plate part 51 is locked with the rotor snap 4. Here, the inner rim of the cover 2 is interposed between the upper surface of the ring-shaped plate part 51 and the lower surface of the holding projection 44 of the rotor snap 4 with a small clearance so that an axial position of the movable-side housing with respect to the fixed-side housing is regulated. In addition, since the ring-shaped plate part 51 does not regulate the radial position of the movable-side housing with respect to the fixed-side housing, a clearance between the outer surface of the ring-shaped plate part 51 and the wall surface forming the step of the engaging step 24 can be set to relatively large not to cause sliding sound. Furthermore, as shown in FIGS. 1 and 2, the ring-shaped plate part 51 is provided with a cam part 52 facing downward on the lower end thereof to form a cancel member 5 in a vertical direction. However, since the rotating prevention projections 45 and the notch parts 54 are engaged with each other, the ring-shaped plate part 51 can be fixed so as not to move in the circumferential direction with respect to the rotor 3 and can perform stable canceling operation by engaging with a cancel mechanism. Moreover, when the ring-shaped plate part 51 does not have a function of the cancel member 5, it goes without saying that the cam part 52 is omitted. Further, radial size of the ring-shaped plate part 51 from the rotation axis thereof is set to have relatively large clearance with respect to radial size of the wall surface forming the step of the engaging step 24 from the rotation axis thereof.

Each of the flexible cables 6 is formed to have required length by laminating a plurality of beaten conductors on the insulating film, and is received to be able to be wound or rewound in ring-shaped space formed by assembling the case 1, the cover 2, and the rotor 3. Furthermore, although an example having two flexible cables is shown in FIGS. 1 and 2, the number of the flexible cables 6 is not limited thereto and may be one or more. Both ends of each of the flexible cables 6 are connected to external connectors (not shown) provided to the cover 2 and rotor 3, respectively, and signals flowing through the flexible cables 6 are transmitted to the outside through the external connectors.

The ring-shaped holder 7 is composed of a ring-shaped substrate 71, a plurality of roller holders 72 and cable winding parts 73 formed on one surface of the substrate 71, and an elastic part 74 for elastically biasing the substrate 71 on the upper surface of the cover 2. On the other hand, each of rollers 8 is formed in a cylindrical shape, and is rotatably mounted on each of the roller holders 72. The ring-shaped holder 7 and the rollers 8 are rotatably received in ring-shaped space formed by assembling the case 1, the cover 2, and the rotor 3. The flexible cables 6 are wound on the cable winding parts 73 and the rollers 8 in a required manner, and are wound or rewound depending on normal and reverse rotation of the rollers 8.

Hereinafter, a method of assembling the rotary connector according to the embodiment will be described.

First, both ends of each of the flexible cables 6 are connected to the connectors (not shown) provided to the cover 2 and the rotor 3, respectively.

Next, the cylindrical part 32 of the rotor 3 is inserted into the case 1, and the top panel part 31 of the rotor 3 is joined on the upper surface of the case 1. After that, the flexible cables 6 are received in ring-shaped space formed between the case 1 and the rotor 3.

Then, the ring-shaped holder 7 having the rollers 8 mounted thereon is assembled in the ring-shaped space, and the flexible cables 6 are wound and rewound on the rollers 8 and the cable winding parts 73 formed on the ring-shaped holder 7.

Next, the second locking segments 37 formed on the first cylindrical part 32 of the rotor 3 and the second engaging parts 43 formed on the second cylindrical part 41 of the rotor snap 4 are snap-fitted to each other so that the rotor 3 and the rotor snap 4 are united.

After that, the holding step 23 formed on the inner rim of the upper surface of the cover 2 is contacted with the holding projection 44 formed on the second cylindrical part 41 of the rotor snap 4. Then, the first engaging parts 11 formed on the lower side of the outer circumferential surface of the case 1 and the locking segments 21 formed on the outer circumferential surface of the cover 2 are snap-fitted to each other to join the cover 2 to the lower surface of the case 1.

Finally, the rotating prevention projections 45 formed on the lower end of the rotor snap 4 are intruded into the notch parts 54 formed on the ring-shaped plate part 51. After that, the locking parts 42 formed on the rotor snap 4 and the engaging parts 53 formed on the ring-shaped plate part 51 are snap-fitted to each other so that the cancel member 5 is united with the case 1, the cover 2, and the rotor 3.

In the rotary connector according to the present embodiment, the inner rim of the cover 2 is interposed between the holding projection 44 and the ring-shaped plate part 51 with a small clearance, and the side surface of the holding projection 44 faces the wall surface forming the step of the holding step 23 with a small clearance. Therefore, it is possible to simultaneously regulate an axial position and a radial position of the movable-side housing with respect to the fixed-side housing by a portion close to a rotation axis of the rotor (movable-side housing) 3, and to accurately mold the position regulating portions with resin. Moreover it is possible to reduce deformation caused by temperature variation and variation per hour. For this reason, it is possible to suppress occurrence of abnormal noise during the rotation of the movable-side housing.

In addition, in the rotary connector according to the present embodiment, the ring-shaped holder 7 having the rollers 8 for reversing the flexible cables 6 is arranged in receiving space, and the ring-shaped holder 7 is rotatably supported on the second cylindrical part 41 of the rotor snap 4. Accordingly, it is possible to smoothly wind or rewind the flexible cables 6 and to suppress occurrence of abnormal noise during the rotation of the movable-side housing.

Furthermore, in the rotary connector according to the present embodiment, since the engaging step 24 is formed on the inner rim of the lower surface of the cover 2 and the wall surface of the engaging step 24 faces the side surface of the ring-shaped plate part 51, it is possible to reduce a height of the rotary connector as a height of the engaging step 24 is reduced. Therefore, the rotary connector can be slimmed.

Moreover, in the rotary connector according to the present embodiment, since the ring-shaped holder 7 is provided with the elastic part 74 for elastically biasing the substrate 71 on the upper surface of the cover 2, it is possible to suppress rattling of the ring-shaped holder 7 in the direction of a rotation axis thereof and to reduce the rattle even when the rotary connector vibrates in the up-and-down direction.

In addition, in the rotary connector according to the present embodiment, since the ring-shaped plate part 51 is provided with the cam part 52 for connecting the cancel mechanism, it is possible to cope with a different kind of a cancel mechanism that has a different connection part to be connected to the cam part 52 just by replacing the ring-shaped plate part 51. Accordingly, it is possible to commoditize the movable-side housing and the fixed-side housing, and to reduce manufacturing cost of the rotary connector having the cancel member.

Furthermore, in the embodiment of the invention, although the fixed-side housing is formed by combining the case 1 with the cover 2, the invention is not limited thereto and the fixed-side housing can have an integral structure that is composed of a case and a cover.

Moreover, although the embodiment of the invention includes the ring-shaped holder 7 and rollers 8, the invention is not limited thereto and the ring-shaped holder 7 and rollers 8 can be omitted according to the winding structure for winding the flexible cables 6.

Figure 3:
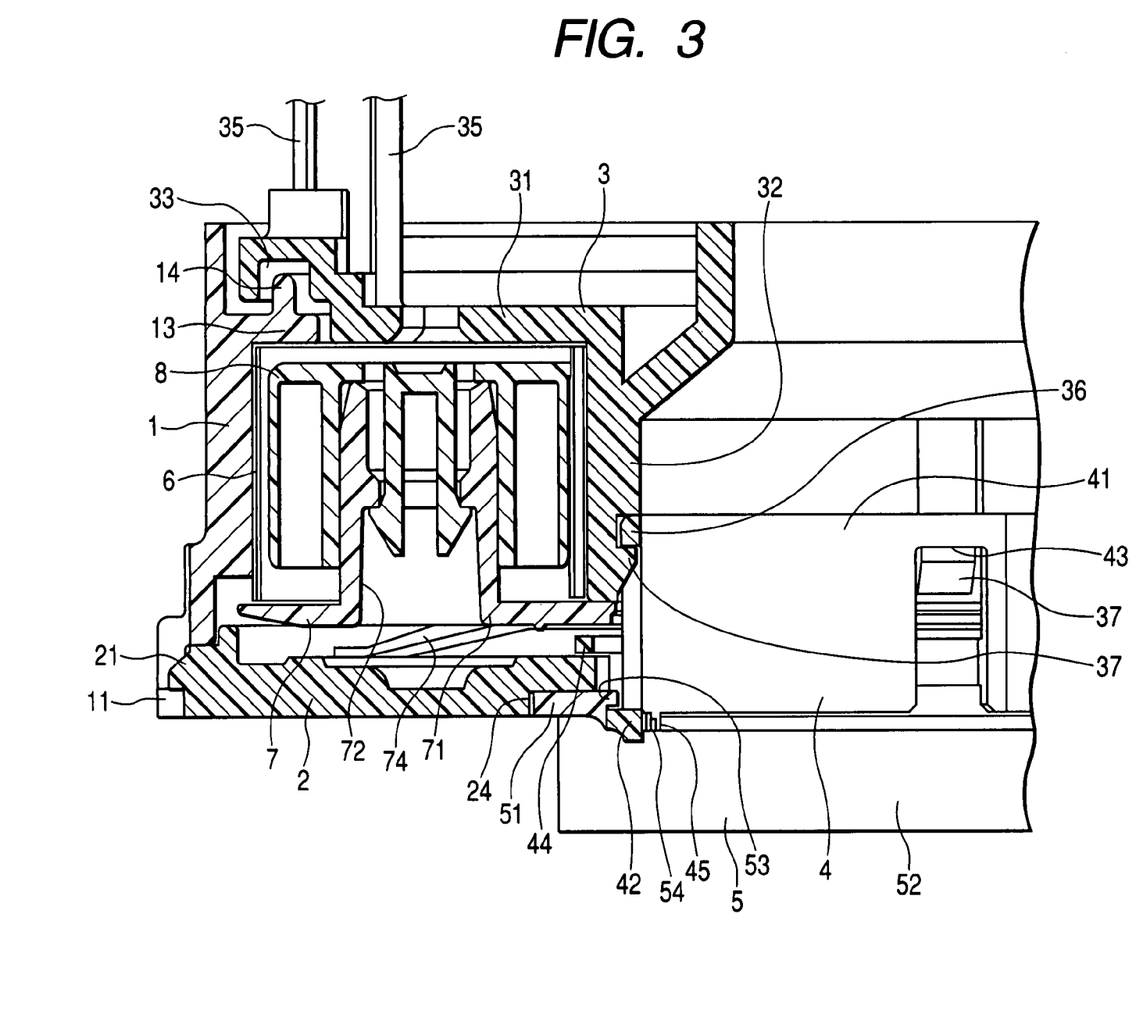
FIG. 3 is a cross-sectional view showing main parts of the rotary connector according to a second embodiment of the invention.

Next, a rotary connector according to a second embodiment of the invention will be described with reference to FIG. 3. FIG. 3 is a cross-sectional view showing main parts of the rotary connector according to a second embodiment of the invention.

In the second embodiment according to the invention, the same reference numerals are given to the same components as those of the first embodiment, and the descriptions thereof are omitted. Differences between the first and the second embodiment are as follows: a step (holding step 23) is not formed on an inner rim of an upper surface of a cover 2 and holding projections 44 formed on an outer circumferential surface of a second cylindrical part 41 are contacted with the inner rim of the upper surface of the cover 2. Size of a wall surface forming a step of an engaging step 24 is set so that the wall surface of the engaging step 24 faces a side surface of a ring-shaped plate part 51 with a small clearance. For this reason, a radial position of a movable-side housing with respect to a fixed-side housing is regulated.

In a method of assembling the rotary connector according to the second embodiment, the upper surface of the cover 2 is contacted with the lower surface of the holding projection 44 formed on the second cylindrical part 41 of the rotor snap 4, and first engaging parts 11 formed on the lower side of the outer circumferential surface of the case 1 and locking segments 21 formed on the outer circumferential surface of the cover 2 are snap-fitted to each other to join the cover 2 to the lower surface of the case 1.

In the rotary connector according to the second embodiment, the inner rim of the cover 2 is interposed between the holding projection 44 and the ring-shaped plate part 51 with a small clearance, and a side surface of the ring-shaped plate part 51 faces a wall surface forming the step of an engaging step 24 with a small clearance. Therefore, it is possible to simultaneously regulate an axial position and a radial position of the movable-side housing with respect to the fixed-side housing by a portion close to a rotation axis of the rotor (movable-side housing) 3, and to accurately mold the position regulating portions with resin. Moreover it is possible to reduce deformation caused by temperature variation and variation per hour. For this reason, it is possible to suppress occurrence of abnormal noise during the rotation of the movable-side housing.

Furthermore, in the rotary connector according to the second embodiment, since the engaging step 24 is formed on the inner rim of the lower surface of the cover 2 and the wall surface of the engaging step 24 faces the side surface of the ring-shaped plate part 51, it is possible to reduce a height of the rotary connector as a height of the engaging step 24 is reduced. Therefore, the rotary connector can be slimmed.

In addition, in the rotary connector according to the present embodiment, since the ring-shaped plate part 51 is provided with the cam part 52 for connecting the cancel mechanism, it is possible to cope with various cancel mechanism just by replacing the ring-shaped plate part 51. Accordingly, it is possible to commoditize the movable-side housing and the fixed-side housing, and to reduce manufacturing cost of the rotary connector having the cancel member.

Figure 4:
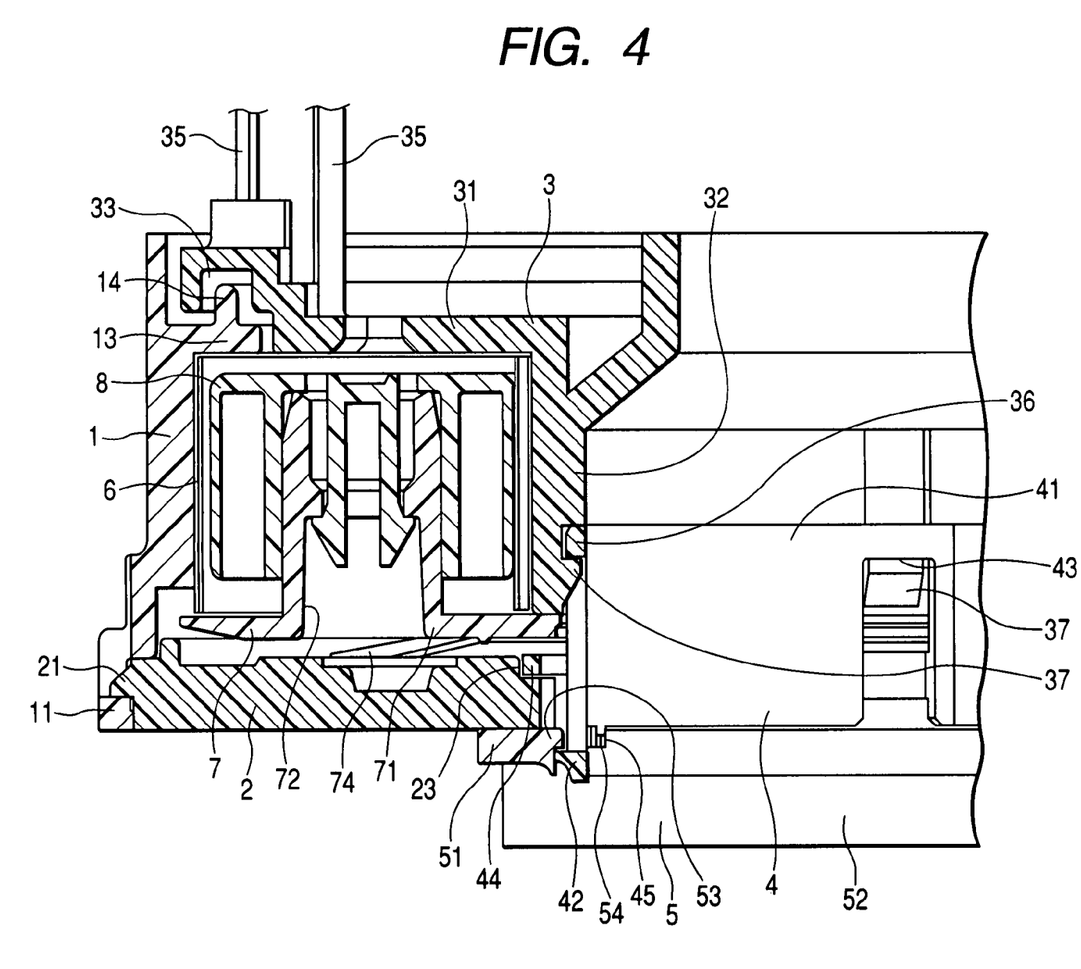
FIG. 4 is a cross-sectional view showing main parts of the rotary connector according to a third embodiment of the invention.

Next, a rotary connector according to a third embodiment of the invention will be described with reference to FIG. 4. FIG. 4 is a cross-sectional view showing main parts of the rotary connector according to a third embodiment of the invention.

In the rotary connector according to the third embodiment, as shown in FIG. 4, a holding step 23 capable of receiving an outer circumferential surface of holding projection 44 which is formed on a rotor snap 4 is formed on an inner rim of an upper surface of the cover 2 instead of forming an engaging step 24 on an inner rim of a lower surface of the cover 2, as shown in FIG. 3.

A wall surface forming a step of the holding step 23 is formed so as to face the side surface of the holding projection 44 formed on the rotor snap 4 with a small clearance when the cover 2 and the rotor snap 4 are assembled with each other. In addition, a wall surface forming a step of the holding step 23 is formed so that an inner rim of the cover 2 is interposed, with a small clearance, between the lower surface of the holding projection 44 formed on the rotor snap 4 and a ring-shaped plate part 51 included in the cancel member 5 when the cover 2, the rotor snap 4, and a cancel member 5 are assembled with each other.

In the rotary connector according to the third embodiment, the inner rim of the cover 2 is interposed between the lower surface of the holding projection 44 formed on the rotor snap 4 and upper surface of the ring-shaped plate part 51 with a small clearance so that an axial position of the movable-side housing with respect to the fixed-side housing is regulated. Furthermore, the wall surface forming the step of the holding step 23 faces the side surface of the holding projection 44 with a small clearance so that a radial position of the movable-side housing with respect to the fixed-side housing is regulated. Therefore, it is possible to regulate an axial position and a radial position of the movable-side housing with respect to the fixed-side housing by a portion of the movable-side housing close to a rotation axis. For this reason, similarly to the rotary connector according to the first embodiment of the invention, it is possible to accurately mold the position regulating portions with resin, and to reduce deformation caused by temperature variation and variation per hour. Accordingly, it is possible to suppress occurrence of abnormal noise during the rotation of the movable-side housing.

Moreover, in the third embodiment of the invention, although the fixed-side housing is formed by combining the case 1 with the cover 2, the invention is not limited thereto and the fixed-side housing can have an integral structure that is composed of a case and a cover.

In addition, although the third embodiment of the invention includes the ring-shaped holder 7 and rollers 8, the invention is not limited thereto and the ring-shaped holder 7 and rollers 8 can be omitted according to the winding structure for winding the flexible cables 6.

A rotary connector according to the invention includes a fixed-side housing that includes a cylindrical case and a ring-shaped cover for covering a lower open end of the case; a movable-side housing that includes a ring-shaped top panel part for covering an upper open end of the case and a first cylindrical part protruding downward from an inner circumferential end of the top panel part; a rotor snap that includes a second cylindrical part connected to the first cylindrical part by being inserted therein to from under the cover and locking parts having segments protruding outward from a lower end of the second cylindrical part in a radial direction thereof; a receiving space that is formed by rotatably assembling the movable-side housing to the fixed-side housing; flexible cables that are electrically connected to the fixed-side housing and the movable-side housing in the receiving space; and a ring-shaped plate part that is locked with the locking parts. In this case, holding projection projects outward in a radial direction from the outer circumferential surface of the second cylindrical part between a lower end of the first cylindrical part and the locking parts, and a holding step is provided so as to form a step on the inner rim of the upper surface of the cover. Furthermore, a wall surface forming the step of the holding step faces side surface of the holding projection, and an inner rim of the cover is rotatably interposed between lower surface of the holding projection and an upper surface of the ring-shaped plate part. Accordingly, the cover is rotatably interposed between the holding projection and the ring-shaped plate part, and a wall surface forming the step of the holding step faces side surface of the holding projection. For this reason, it is possible to regulate an axial position and a radial position of the movable-side housing with respect to the fixed-side housing by a portion of the movable-side housing close to a rotation axis. Therefore, it is possible to accurately mold the position regulating portions of the movable-side housing with respect to the fixed-side housing with resin, and to reduce deformation caused by temperature variation and variation per hour thereby suppressing occurrence of abnormal noise during the rotation of the movable-side housing.

Moreover, a rotary connector according to the invention includes a fixed-side housing that includes a cylindrical case and a ring-shaped cover for covering a lower open end of the case; a movable-side housing that includes a ring-shaped top panel part for covering an upper open end of the case and a first cylindrical part protruding downward from an inner circumferential end of the top panel part; a rotor snap that includes a second cylindrical part connected to the first cylindrical part by being inserted therein to from under the cover and locking parts having segments protruding outward from a lower end of the second cylindrical part in a radial direction thereof; receiving space that is formed by rotatably assembling the movable-side housing to the fixed-side housing; flexible cables that are electrically connected to the fixed-side housing and the movable-side housing in the receiving space; and a ring-shaped plate part that is locked with the locking parts. In this case, holding projection projects outward in a radial direction from the outer circumferential surface of the second cylindrical part between a lower end of the first cylindrical part and the locking parts, and an inner rim of the cover is rotatably interposed between lower surface of the holding projection and an upper surface of the ring-shaped plate part. Furthermore, an inner rim of the cover is provided with a wall surface forming a step that faces side surface of the holding projection or a side surface of the ring-shaped plate part with a small clearance. Accordingly, an axial position and a radial position of the movable-side housing with respect to the fixed-side housing can be regulated by a portion of the movable-side housing close to a rotation axis. Consequently, it is possible to accurately mold the position regulating portions of the movable-side housing with respect to the fixed-side housing with resin and to reduce deformation caused by temperature variation and variation per hour thereby suppressing occurrence of abnormal noise during the rotation of the movable-side housing.

What is claimed is:

1. A rotary connector comprising:
    a fixed-side housing that includes a cylindrical case and a ring-shaped cover for covering a lower open end of the case;
    a movable-side housing that includes a ring-shaped top panel part for covering an upper open end of the case and a first cylindrical part protruding downward from an inner circumferential end of the top panel part;
    a rotor snap that includes a second cylindrical part connected to the first cylindrical part by being inserted thereinto from under the cover and locking parts having segments protruding outward from a lower end of the second cylindrical part in a radial direction thereof;
    a receiving space that is formed by rotatably assembling the movable-side housing to the fixed-side housing;
    flexible cables that are electrically connected to the fixed-side housing and the movable-side housing in the receiving space; and
    a ring-shaped plate part that is locked with the locking parts;
    wherein a holding projection projects outward in a radial direction from an outer circumferential surface of the second cylindrical part between a lower end of the first cylindrical part and the locking parts, and a holding step is provided so as to form a step on an inner rim of an upper surface of the cover, and
    a wall surface forming the step of the holding step faces a side surface of the holding projection, and an inner rim of the cover is rotatably interposed between a lower surface of the holding projection and an upper surface of the ring-shaped plate part.

2. The rotary connector according to claim 1, wherein the ring-shaped plate part is detachably locked with the locking parts and includes a cam part protruding downward in a direction of a rotation axis.

3. The rotary connector according to claim 1, wherein a ring-shaped holder, which rotatably supports rollers for reversely winding the flexible cables, is rotatably received in the receiving space, and an inner rim of the ring-shaped holder is rotatably interposed between a lower surface of the first cylindrical part and an upper surface of the holding projection so that the ring-shaped holder is rotatably supported on the second cylindrical part.

4. The rotary connector according to claim 3, wherein the ring-shaped plate part is detachably locked with the locking parts and includes a cam part protruding downward in a direction of a rotation axis.

5. The rotary connector according to claim 3, wherein the ring-shaped holder is provided with an elastic part for elastically biasing the upper surface of the cover.

6. The rotary connector according to claim 5, wherein the ring-shaped plate part is detachably locked with the locking parts and includes a cam part protruding downward in a direction of a rotation axis.

7. The rotary connector according to claim 1, wherein the cover is provided with an engaging step so that a step is formed on an inner rim of a lower surface of the cover, and a wall surface of the engaging step faces a side surface of the ring-shaped plate part.

8. The rotary connector according to claim 7, wherein the ring-shaped plate part is detachably locked with the locking parts and includes a cam part protruding downward in a direction of a rotation axis.

9. The rotary connector according to claim 7, wherein the ring-shaped holder is provided with an elastic part for elastically biasing the upper surface of the cover.

10. The rotary connector according to claim 9, wherein the ring-shaped plate part is detachably locked with the locking parts and includes a cam part protruding downward in a direction of a rotation axis.

11. The rotary connector according to claim 3, wherein the cover is provided with an engaging step so that a step is formed on an inner rim of a lower surface of the cover, and a wall surface of the engaging step faces a side surface of the ring-shaped plate part.

12. The rotary connector according to claim 11, wherein the ring-shaped plate part is detachably locked with the locking parts and includes a cam part protruding downward in a direction of a rotation axis.

13. The rotary connector according to claim 11, wherein the ring-shaped holder is provided with an elastic part for elastically biasing the upper surface of the cover.

14. The rotary connector according to claim 13, wherein the ring-shaped plate part is detachably locked with the locking parts and includes a cam part protruding downward in a direction of a rotation axis.

15. A rotary connector comprising:
    a fixed-side housing that includes a cylindrical case and a ring-shaped cover for covering a lower open end of the case;

a movable-side housing that includes a ring-shaped top panel part for covering an upper open end of the case and a first cylindrical part protruding downward from an inner circumferential end of the top panel part;

a rotor snap that includes a second cylindrical part connected to the first cylindrical part by being inserted thereinto from under the cover and locking parts having segments protruding outward from a lower end of the second cylindrical part in a radial direction thereof;

a receiving space that is formed by rotatably assembling the movable-side housing to the fixed-side housing;

flexible cables that are electrically connected to the fixed-side housing and the movable-side housing in the receiving space; and a ring-shaped plate part that is locked with the locking parts;

wherein a holding projection projects outward in a radial direction from an outer circumferential surface of the second cylindrical part between a lower end of the first cylindrical part and the locking parts, and an inner rim of the cover is rotatably interposed between a lower surface of the holding projection and an upper surface of the ring-shaped plate part, and the inner rim of the cover is provided with a wall surface forming a step that faces a side surface of the holding projection or a side surface of the ring-shaped plate part with a small clearance.

16. The rotary connector according to claim 15, wherein an engaging step capable of receiving an outer circumference of the ring-shaped plate part is formed on an inner rim of a lower surface of the cover, and a wall surface forming a step of the engaging step faces the side surface of the ring-shaped plate part.

17. The rotary connector according to claim 15, wherein a holding step capable of receiving outer circumference of the holding projection is formed on an inner rim of an upper surface of the cover, and a wall surface forming a step of the holding step faces the side surface of the holding projection.

18. The rotary connector according to claim 15, wherein the ring-shaped plate part is detachably locked with the locking parts and includes a cam part protruding downward in a direction of a rotation axis.

* * * * *